United States Patent

Oveyssi et al.

[11] Patent Number: 5,822,155
[45] Date of Patent: Oct. 13, 1998

[54] MAGNETIC LATCH ASSEMBLY FOR A DISK DRIVE INCLUDING A FERROMAGNETIC HOLDER SURROUNDING A PERMANENT MAGNETIC

[75] Inventors: Kamran Oveyssi, Aptos; Andrew John Hudson, Santa Cruz; Walter Butler, Felton, all of Calif.

[73] Assignee: Western Digital Corporation, Irvine, Calif.

[21] Appl. No.: 626,525

[22] Filed: Apr. 2, 1996

[51] Int. Cl.⁶ .................................................. G11B 21/22
[52] U.S. Cl. ............................................................ 360/105
[58] Field of Search ................................ 24/303; 360/105

[56] References Cited

U.S. PATENT DOCUMENTS

| | | | |
|---|---|---|---|
| 4,890,176 | 12/1989 | Casey et al. | 360/105 |
| 5,170,300 | 12/1992 | Stefansky | 360/105 |
| 5,187,627 | 2/1993 | Hickox et al. | 360/105 |
| 5,291,355 | 3/1994 | Hatch et al. | 360/97.01 |
| 5,303,101 | 4/1994 | Hatch et al. | 360/105 |
| 5,343,346 | 8/1994 | Bleeke | 360/105 |
| 5,363,261 | 11/1994 | Eckberg et al. | 360/105 |
| 5,365,389 | 11/1994 | Jabbari et al. | 360/105 |
| 5,452,159 | 9/1995 | Stefansky | 360/105 |
| 5,453,891 | 9/1995 | Takemoto | 360/105 |
| 5,455,728 | 10/1995 | Edwards et al. | 360/105 |

*Primary Examiner*—Craig A. Renner
*Attorney, Agent, or Firm*—Leo J. Young; W. Chris Kim; Milad G. Shara

[57] ABSTRACT

A magnetic latch assembly for immobilizing a read/write head of a disk drive is provided which magnetically couples to an actuator assembly housing the read/write head with enhanced force. A disk drive which includes the magnetic latch assembly is also provided. The magnetic latch assembly includes a magnet and a magnet holder including ferromagnetic material which at least partially surrounds the magnet and provides a medium through which flux produced by one pole of the magnet travels to an opposing pole of the magnet. The latch assembly magnetically couples the actuator assembly by contacting the actuator assembly in an area adjacent one of the poles of the magnet. In one embodiment, the magnet holder includes ferromagnetic material which surrounds the magnet. In another embodiment, the magnet holder includes a plurality of ferromagnetic flanges which at least partially surround the magnet.

23 Claims, 13 Drawing Sheets

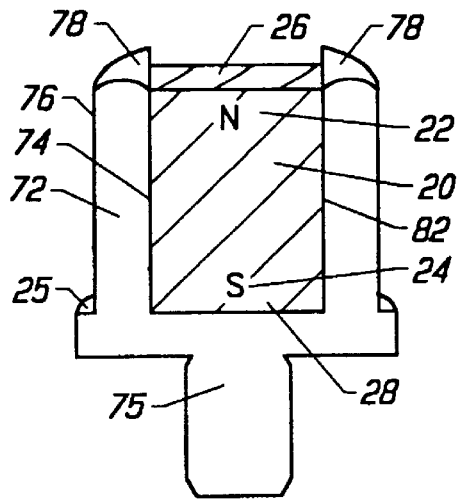
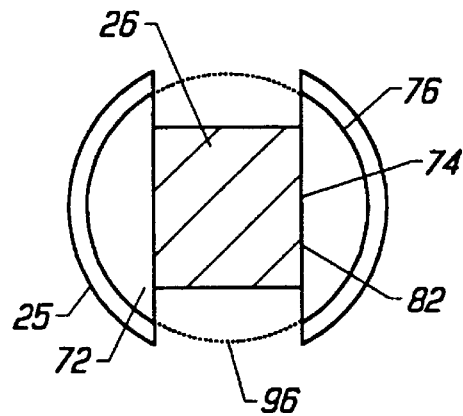
FIG. 6A  FIG. 6B
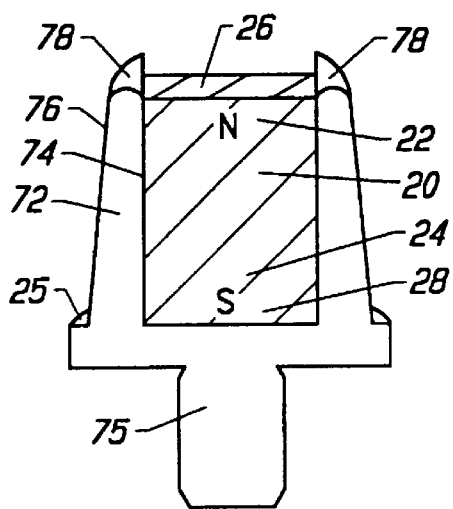
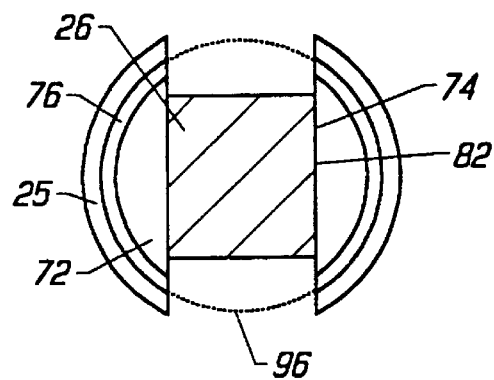
FIG. 6C  FIG. 6D

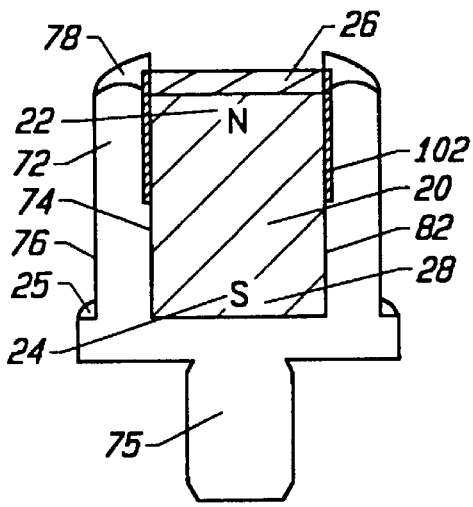
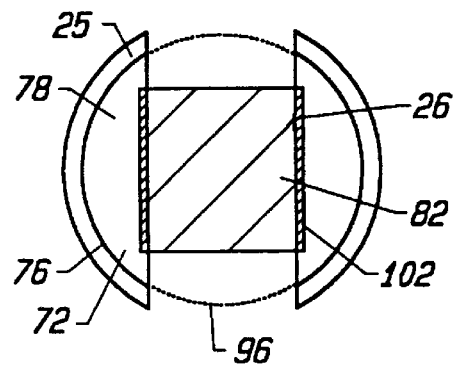
FIG. 9A          FIG. 9B
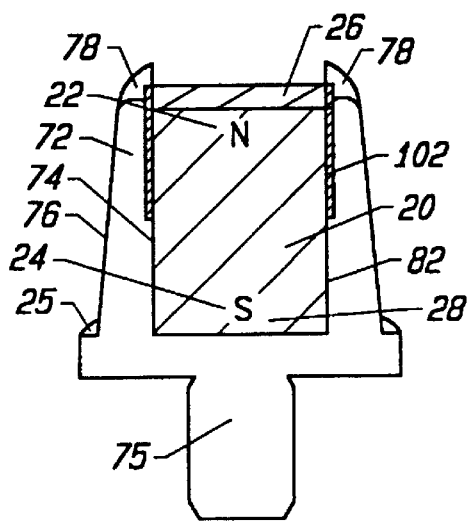
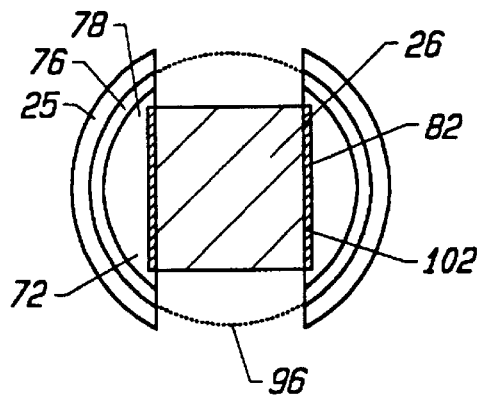
FIG. 9C          FIG. 9D

MAGNETIC LATCH ASSEMBLY FOR A DISK DRIVE INCLUDING A FERROMAGNETIC HOLDER SURROUNDING A PERMANENT MAGNETIC

BACKGROUND OF THE INVENTION

1. Field of the Invention

This invention relates generally to data storage devices and specifically to a magnetic latch assembly for immobilizing an actuator assembly in a disk drive.

2. Background of the Invention

Disk drives are widely used as data storage devices for long-term storage of large quantities of data. A variety of different types of disk drives have been developed, including, for example, magnetic-medium hard drives, magnetic-medium "floppy" diskette drives, and optical CD ROM drives.

Magnetic-medium hard drives generally include a magnetic-medium disk mounted on a rotating spindle that extends through the center of the disk. The disk has a large number of annular magnetic "tracks" on the surface of the disk that provide a plurality of concentric memory locations for "bits" of data. This data is accessed by the positioning of a read/write head over a track as the disk is rotated.

The read/write head and disk surface are positioned in close proximity with each other. However, the read/write head is prevented from contacting the surface of the disk since contact with the disk surface can damage the magnetic disk medium and, hence, the ability of the disk to store data.

The read/write head is generally mounted on an actuator assembly which is used to move and position the read/write head relative to the disk surface. The actuator assembly also functions to immobilize the read/write head at a predetermined location relative to the disk surface when the disk is not in use in order to prevent damage to both the read/write head and the disk media. This function of immobilizing the read/write head assembly is commonly referred to as "parking" or "latching" the drive.

Immobilization of the read/write head is generally accomplished by coupling the actuator assembly to a latch assembly. A variety of mechanisms for coupling an actuator assembly to a latch assembly have been developed. For example, some drives use a spring-biased pivoting latch that holds the actuator assembly in a fixed position under the force of a spring. An electromagnet is used to initially lock and release the latch during operation of the disk drive. Drives which use spring-loaded electromagnets or solenoids to release the latch have the disadvantage of using elements, such as wire coils, that are expensive and difficult to implement because of space and tolerance requirements. In addition, electromagnetic mechanisms for coupling the actuator assembly to the latch require electrical power to be released during the "power-up" of the disk drive and thus are not energy efficient with regard to their use in portable devices.

Disk drives have also been developed which use air flow generated by one or more spinning disks to release a spring-biased latch arm. Air actuated mechanisms have the disadvantage of potentially interfering with the air flow created by the disk as it is rotated which is used to assist the read/write head in moving across the surface of the disk. Air actuated mechanisms have the further disadvantage that the force created by these air flow mechanisms is relatively small. As a result, only a small latching force can be used to couple the actuator assembly to the latch, making air flow mechanisms undesirable for use with portable devices where greater latch forces are needed.

Magnetic attraction between the actuator assembly and the latch assembly has also been used to immobilize the read/write head. See, for example, Bleeke, U.S. Pat. No. 5,343,346; Kelsic et al., U.S. Pat. No. 5,023,736; Casey et. al., U.S. Pat. No. 4,890,176; and Casey et al., U.S. Pat. No. 4,947,274.

U.S. Pat. No. 5,343,346 to Bleeke describes a magnetic latch assembly which provides a single contact point between the latch assembly and an actuator tang. The latch assembly includes a permanent magnet having opposing magnetic poles on opposing first and second ends thereof and a bore extending axially through the magnet between the opposite ends. The latch assembly described in U.S. Pat. No. 5,343,346 to Bleeke also includes a substantially spherically-shaped ferromagnetic metal core which is positioned within the interior bore of the permanent magnet so that a portion of core extends beyond the first end of the magnet to form a single-point magnetic contact for an actuator tang.

The permanent magnet used in the magnetic latch assembly is a composite magnet. One disadvantage associated with using composite magnets is the potential for the magnetic material in the latch assembly to become dislodged and damage the disk medium. This is particularly important when the magnet is formed from brittle alloys, such as rare earth cobalt, or filled polymers containing magnetic particles.

Another disadvantage of the latch assembly design described in U.S. Pat. No. 5,343,346, as shown in FIGS. 8 and 9 of the patent, is that some magnetic flux travels through the air adjacent the outer periphery of the magnet. This path for the magnet flux reduces the flux density of the latch adjacent the ferromagnetic core. In addition, the path of the magnet flux adjacent the outer periphery of the magnet also evidences that the latch is not well shielded. This is disadvantageous since stray magnetic flux can interfere with the operation of other components in the disk drive, such as a voice coil actuator which is adjacent the latch assembly in the disk drive.

A further disadvantage of the latch assembly design described in U.S. Pat. No. 5,343,346 is the limited capacity of the ferromagnetic metal core to absorb flux from the permanent magnet. By positioning the ferromagnetic metal within the core of the permanent magnet, the cross-sectional area of the ferromagnetic metal core is small relative to the permanent magnet. This limits how strong a magnet may be used in the latch assembly without saturating the ferromagnetic metal and thus limits the maximum force with which a latch assembly having a design as described in U.S. Pat. No. 5,343,346 can bind to a tang of an actuator assembly.

In general, when designing a latch assembly for immobilizing an actuator assembly, it is important that the latch assembly couple the actuator assembly with sufficient force, hereinafter referred to as "latch force" to prevent the actuator assembly from disengaging from the latch assembly. It is therefore important that the latch and actuator assemblies be designed to couple to each other with sufficient latch force to withstand the degree of physical shocks to which disk drives may be exposed during their lifetimes. These physical shocks include shocks which can occur during shipping and handling, as well as physical shocks which can occur during use. The need for latch and actuator assemblies which couple with high latch force is particularly important for portable electronic devices where the drive is particularly likely to be exposed to significant physical shocks.

There is only a limited amount of space in the drive within which the latch assembly can be positioned. This creates design constraints with regard to designing latch assemblies with enhanced latch force. It is therefore important that the latch force be increased without significantly increasing the size of the latch assembly.

The latch assembly also should not interfere with the accurate positioning of the actuator assembly during disk operation. Accordingly, it is important that the latch force between the latch assembly and the actuator assembly decrease rapidly as a function of distance between the latch and actuator assemblies. In the case of magnetic latch assemblies, the latch should also be well shielded so that stray magnetic flux does not interfere with the operation of components within the disk drive, such as a voice coil actuator.

A great deal of pricing pressure exists in the disk drive market. It is therefore important that any latch assembly developed be inexpensive and simple to manufacture.

Accordingly, a need exists for a latch assembly which exhibits enhanced latching force. The latch assembly should provide enhanced latch force while having substantially the same size as current latch assemblies. The latch assembly should also be simple and inexpensive to manufacture. The latch assembly should also not interfere with the accurate positioning of the actuator assembly during usage or damage the disk medium because of stray particles created by material decomposition. These and other objects are achieved by the latch assembly of this invention which is described herein.

SUMMARY OF THE INVENTION

This invention relates to a magnetic latch assembly for immobilizing a read/write head of a disk drive by magnetically coupling an actuator assembly with enhanced force. This invention also relates to disk drives which incorporate the magnetic latch assembly of this invention. In general, the magnetic latch assembly includes a magnet and a magnet holder which includes ferromagnetic material which at least partially surrounds the magnet and provides a medium through which magnetic flux produced by one pole of the magnet travels to the opposing pole of the magnet.

In one embodiment, the magnetic latch assembly includes a ferromagnetic magnet holder having a space for holding a magnet. The magnet holder includes an inner surface surrounding the space, an outer surface defining an exterior portion of the magnet holder and an end surface connecting the inner and outer surfaces of the magnet holder. The latch assembly also includes a permanent magnet having a first magnetic pole at a first end and a second magnetic pole at a second end of the magnet. The permanent magnet is positioned within the space such that the magnet produces magnetic flux which extends between the first end of the magnet and the end surface of the magnet holder to magnetically couple an actuator assembly.

In another embodiment, the magnet holder includes a base and a plurality of flanges defining a space between the flanges for holding a magnet. The plurality of flanges are formed from a unitary body of ferromagnetic material where each flange has an inner surface facing the space, an outer surface defining an exterior portion of the magnet holder and an end surface connecting the inner and outer surfaces of the flanges. In one embodiment, the inner surfaces of the plurality of flanges are flat and in another embodiment are concave. The latch assembly also includes a permanent magnet having a first magnetic pole at a first end and a second magnetic pole at a second end. The permanent magnet is positioned within the space such that the magnet produces magnetic flux which extends between the first end of the magnet and the end surfaces of the flanges to magnetically couple an actuator assembly. In one embodiment, the magnetic latch assembly includes at least three flanges which are substantially evenly distributed around the magnet.

In one embodiment, the end surface of the magnet holder surrounds the first end of the magnet, the magnetic flux being distributed substantially uniformly around the first end of the magnet to the magnet holder.

In one embodiment of the latch assembly, substantially all of the magnetic flux extends between the first end of the magnet and the end surface of the magnet holder or plurality of flanges.

In any of the above embodiments, the end surface of the magnet holder may have a convex shape which focuses the magnetic flux on the end surface of the magnet holder. The space in the magnet holder may be substantially cylindrically shaped. The magnet may also be substantially cylindrically shaped. The outer surface of the magnet holder or the plurality of flanges may define an exterior portion of the magnet holder which is substantially cylindrically shaped. The outer surface of the magnet holder or the plurality of flanges may also define an exterior portion of the magnet holder which is substantially conically shaped, the radius of the conically shaped outer surface decreasing in the direction of the end surface. The latch assembly may also include a material having low magnetic permeability positioned between the magnet holder and the magnet adjacent the end surface of the magnet holder to focus the magnetic flux on the end surface of the magnet holder. In one embodiment, the low magnetic permeability material surrounds the magnet adjacent the first end of the magnet.

The latch assembly may also include a bumper which forms a contact area between the magnetic latch assembly and the actuator assembly to dampen collisions between the magnetic latch assembly and the actuator assembly. In one embodiment, the bumper is annular shaped and is centered around the first end of the magnet to create an annular contact area between the magnetic latch assembly and the actuator assembly. The annular shaped bumper may also have a radial cross-section with a surface having a convex shape in order to reduce the contact area between the latch assembly and the actuator assembly. In another embodiment, the bumper covers the first end of the magnet. In this embodiment, the bumper may also have an outer surface which has a convex shape which forms a single contact point between the magnetic latch assembly and the actuator assembly.

The magnet used in the latch assembly may be any form of magnet. In one embodiment the magnet is a solid magnet, preferably a solid sintered magnet formed of a rare earth metal alloy. In one embodiment, magnet has a magnetic field intensity of at least $1.6 \times 10^5$ Tesla Ampere/meter (20

MGOe). Particular examples of magnets which may be used in this invention include, but are not limited to neodymium-iron-boron and samarium-cobalt.

The ferromagnetic material included in the magnet holder may be any ferromagnetic material. In one embodiment, the ferromagnetic material is a magnetic stainless steel such as 12L14 magnetic steel.

BRIEF DESCRIPTION OF THE DRAWING

Reference is now made to the drawing, wherein:

FIGS. 6A–6D show structural variations of a latch assembly where the magnet holder has a plurality of flanges and in which the flanges have flat inner surfaces, wherein FIG. 6A provides a cross-sectional view of the latch assembly with a convex end surface, FIG. 6B provides a top-down view of the latch assembly with a convex end surface, FIG. 6C provides a cross-sectional view of the latch assembly with a conically shaped outer surface, and FIG. 6D provides a top-down view of the latch assembly with a conically shaped outer surface;

FIGS. 9A–9D show structural variations of a latch assembly where the magnet holder has a plurality of flanges where the flanges have a flat inner surface and where the latch assembly includes a material with low magnetic permeability positioned between the magnet and the magnet holder, wherein FIG. 9A provides a cross-sectional view of the latch assembly, FIG. 9B provides a top-down view of the latch assembly, FIG. 9C provides a cross-sectional view of the latch assembly with a conically shaped outer surface, and FIG. 9D provides a top-down view of a latch assembly with a conically shaped outer surface;

FIGS. 11A–11C show a latch assembly of this invention in which the magnet holder surrounds the magnet and the latch assembly includes a bumper adjacent an end of the magnet holder, wherein FIG. 11A shows a cross-sectional view of the latch assembly with an annular shaped bumper, FIG. 11B shows a top-down view of the latch assembly with an annular shaped bumper, and FIG. 11C shows a cross-sectional view of the latch assembly with a bumper which extends over an end of the magnet;

FIGS. 12A–12C show a latch assembly of this invention where the magnet holder has a plurality of flanges and the latch assembly includes a bumper adjacent an end of the magnet holder, wherein FIG. 12A shows a cross-sectional view of the latch assembly with an annular shaped bumper, FIG. 12B shows a top-down view of the latch assembly with an annular shaped bumper, and FIG. 12C shows a cross-sectional view of the latch assembly with a bumper which extends over an end of the magnet.

DETAILED DESCRIPTION OF THE PREFERRED EMBODIMENTS

Figure 1A:
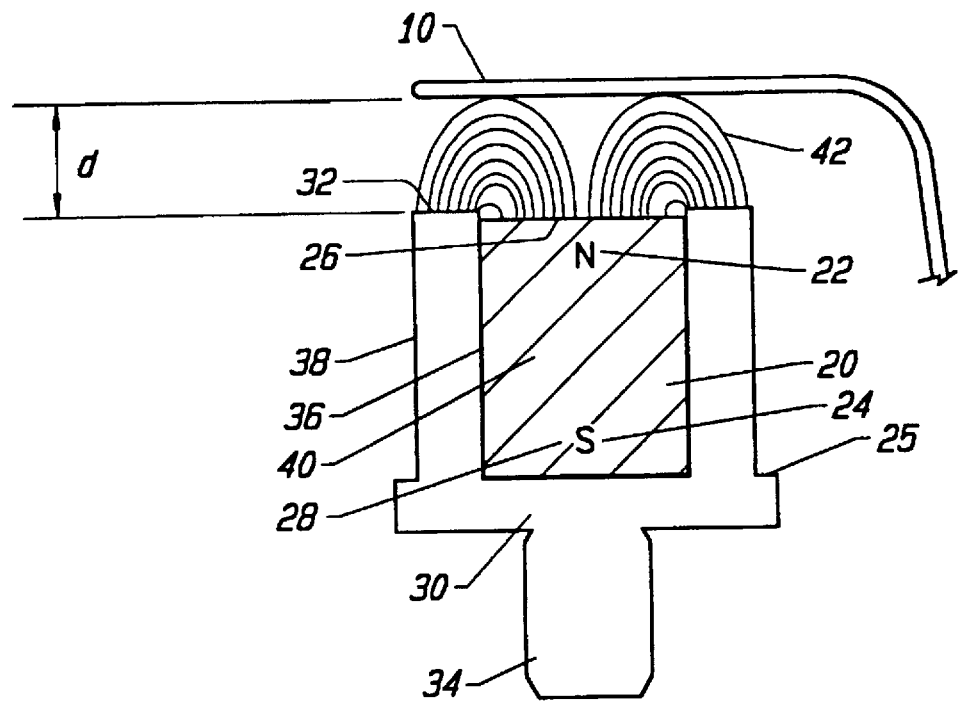
FIGS. 1A–1B show a latch assembly of this invention in which the magnet holder surrounds the magnet, wherein FIG. 1A provides a cross-sectional view of the latch assembly, and FIG. 1B provides a top-down view of the latch assembly.

This invention relates to a magnetic latch assembly for immobilizing a read/write head of a disk drive by magnetically coupling an actuator assembly with enhanced force. This invention also relates to disk drives which include the magnetic latch assembly of this invention.

According to this invention, the magnetic latch assembly includes a magnet and a ferromagnetic magnet holder which at least partially surrounds the magnet and provides a medium through which flux produced from one pole of the magnet travels to an opposing pole of the magnet. The latch assembly magnetically couples the actuator assembly by contacting the actuator assembly in an area adjacent a pole of the magnet.

By having the ferromagnetic magnet holder at least partially surround the magnet, the ferromagnetic magnet holder more effectively collects magnetic flux from the magnet. This serves to enhance the flux density of the latch assembly adjacent where the latch couples the actuator assembly. In addition, having the ferromagnetic magnet holder at least partially surround the magnet also enables the ferromagnetic magnet holder to more effectively shield the other components in the disk drive from magnetic flux generated by the latch magnet.

The use of a ferromagnetic magnet holder which at least partially surrounds a magnet, as opposed to a design where the magnet surrounds a ferromagnetic core (See U.S. Pat. No. 5,343,346), provides the additional advantage of enabling one to increase the ratio between the cross-sectional area of the ferromagnetic material and the magnet without increasing the overall cross-sectional area of the latch assembly. By increasing the cross-sectional area of the ferromagnetic material, a greater amount of flux can be transferred from the magnet to the ferromagnetic material before saturating the ferromagnetic material As a result, one is able to use smaller, stronger magnets in the latch assembly of this invention in order to increase the flux density of the latch without increasing the size of the latch assembly or saturating the ferromagnetic material.

In various embodiments of this invention, the magnetic latch assembly couples to the actuator assembly with enhanced force because the magnetic latch assembly has enhanced magnetic flux density in an area adjacent where the latch assembly contacts the actuator assembly. Enhancement of the magnetic flux density in the area adjacent where the latch assembly contacts the actuator assembly is accomplished by several structural features of the magnetic latch assembly which, alone and in combination, reduce the area over which the flux field from the magnet enters the ferromagnetic magnetic holder which at least partially surrounds the magnet.

By focusing the magnetic flux onto a smaller area of the magnet holder, as opposed to simply increasing the strength or size of the magnet, the latch assembly of this invention is able to couple to the actuator assembly with greater force, hereinafter referred to as "latching force", as compared to latch assemblies having similarly sized and powered magnets.

By at least partially surrounding the magnet with the ferromagnetic magnet holder, more ferromagnetic material is available to absorb the magnetic flux produced by the magnet. This enables stronger magnets to be used in the latch assembly of this invention without saturating the ferromagnetic magnet holder with magnetic flux. As a result, greater magnetic flux densities can be formed adjacent where the latch assembly contacts the actuator assembly as compared to previous latch assemblies.

In one embodiment, the ferromagnetic material included in the magnet holder is formed from a single piece of metal. This makes the latch assembly of this invention simple and inexpensive to manufacture.

Figure 1B:
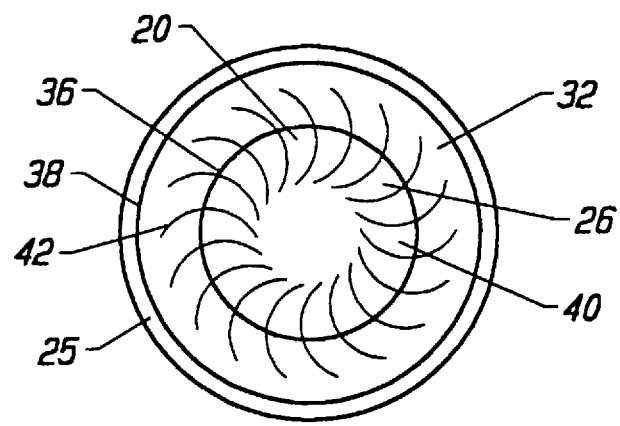

An embodiment of the latch assembly of this invention is shown in FIGS. 1A–1B. According to this embodiment, the magnetic latch assembly includes a ferromagnetic magnet holder 30. The magnet holder 30 includes a base 34, a space 40 for holding a magnet, an inner surface 36 surrounding the space 40, and an outer surface 38 which defines an exterior portion of the magnet holder 30. The magnet holder 30 also has an end surface 32 which connects the inner and outer surfaces 36, 38 of the magnet holder 30. As shown in FIG. 1A, the magnetic latch assembly contacts the tang 10 of an actuator assembly of a disk drive adjacent the end surface 32 of the magnetic latch assembly in order to couple the actuator assembly to the latch assembly.

The magnetic latch assembly also includes a permanent magnet 20 having a first magnetic pole 22 at a first end 26 and a second magnetic pole 24 at a second end 28 of the magnet. The permanent magnet 20 is positioned within the space 40 of the magnet holder 30 such that the magnet 20 produces magnetic flux 42 which extends between the first end 26 of the magnet 20 and the end surface 32 of the magnet holder 30 to magnetically couple the magnetic latch assembly to the actuator assembly by a tang 10.

As shown in FIG. 1A, magnetic flux 42 flows from the magnet adjacent one end of the magnet 20 to the tang 10 and then into the end surface 32 of the magnet holder 30. By having the magnet holder 30 at least substantially surround the magnet 20, virtually all of the magnetic flux 42 from the magnet 20 is directed to the end surface 32 of the magnet holder 30. As a result, the magnetic flux 42 from the magnet 20 does not extend through the air around the perimeter of the latch assembly. This enables virtually all of the magnetic flux to be collected by the magnet holder 30 which, in turn, enhances the flux density of the latch assembly adjacent where the latch couples the actuator assembly. Having the magnet holder 30 surround the magnet 20 so that virtually all of the magnetic flux is collected by the magnet holder 30 also enhances the ability of the latch assembly to shield other components in the disk drive from the magnetic flux generated by the latch magnet.

In one embodiment, as shown in FIG. 1B, the end surface 32 of the magnet holder 30 surrounds the first end 26 of the magnet 20 such that magnetic flux 42 is distributed substantially uniformly around the first end 26 of the magnet 20 to the magnet holder 30.

As also shown in FIG. 1B, the space 40 in the magnet holder 30 and the magnet 20 may each be substantially cylindrically shaped. The outer surface 38 of the magnet holder 30 may also define an exterior portion of the magnet holder 30 which is substantially cylindrically shaped. Although the space 40, magnet 20 and outer surface 38 of the magnet holder 30 may have different shapes, it is generally preferred that the space 40, magnet 20 and outer surface 38 of the magnet holder 30 be substantially cylindrically shaped because of the ease with which these substantially cylindrically shaped pieces can be formed. For example a substantially cylindrically shaped space 40 may be formed by drilling a hole in a piece of metal.

The use of a space 40, magnet 20 and/or outer surface 38 of a magnet holder 30 which have a substantially cylindrical shape is advantageous to uniformly distributing the magnetic flux from the magnet to the magnet holder. A uniform distribution is advantageous in that it causes the latching force provided by the latch assembly to be uniformly distributed across the latch assembly end at a set distance (d)

from the latch assembly end. This is important for calibrating the drive with regard to the amount of force required to separate the latch assembly from the tang.

Figure 2A:
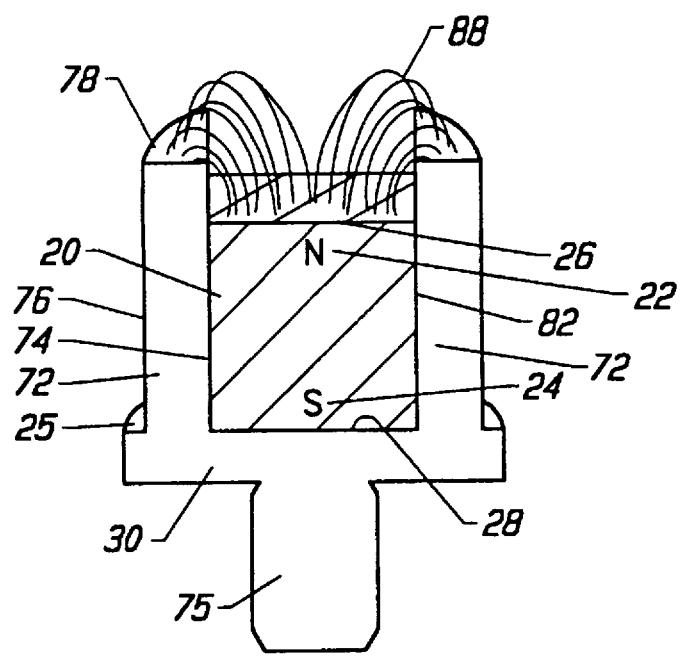
FIGS. 2A–2B show a latch assembly of this invention which includes a magnet holder having a plurality of flanges, wherein FIG. 2A provides a cross-sectional view of the latch assembly, and FIG. 2B provides a top-down view of the latch assembly.
Figure 2B:
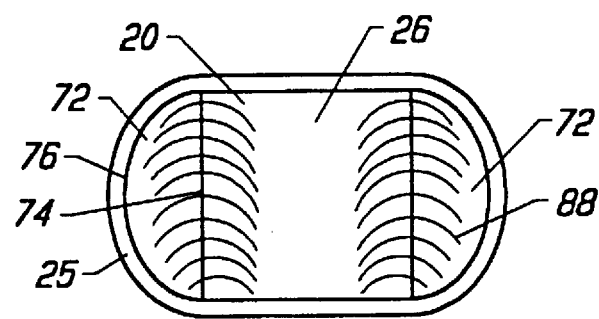

FIGS. 2A–2B show an alternative embodiment of the latch assembly of this invention. According to this embodiment, the magnetic latch assembly includes a magnet holder 30 having a base 75 and a plurality of flanges 72 which define a space 40 between the flanges 72 for holding a magnet. In this embodiment, the plurality of flanges 72 are formed from an unitary body of ferromagnetic material where each flange has an inner surface 74 facing the space 40, an outer surface 76 defining an exterior portion of the magnet holder 30 and an end surface 78 connecting the inner and outer surfaces 74, 76 of the flanges 72.

Included within the space 40 formed by the plurality of flanges is a permanent magnet 20 having a first magnetic pole 22 at a first end 26 and a second magnetic pole 24 at a second end 28. The permanent magnet 20 is positioned within the space 40 such that the magnet 20 produces magnetic flux 88 which extends between the first end 26 of the magnet 20 and the end surfaces 78 of the flanges 72 to magnetically couple the actuator assembly 14.

Figure 3A:
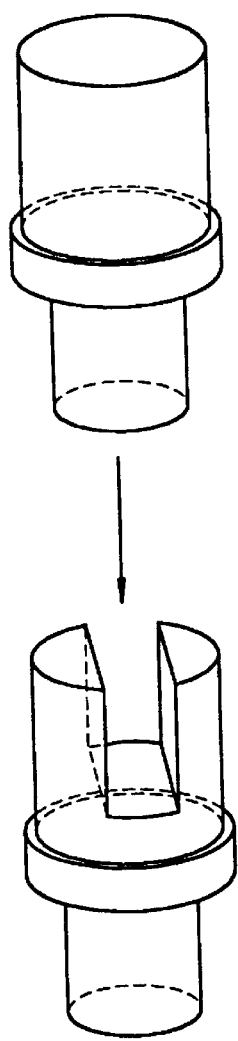
FIG. 3A shows a sequence for forming the magnet holder shown in FIGS. 2A–B.
Figure 3B:
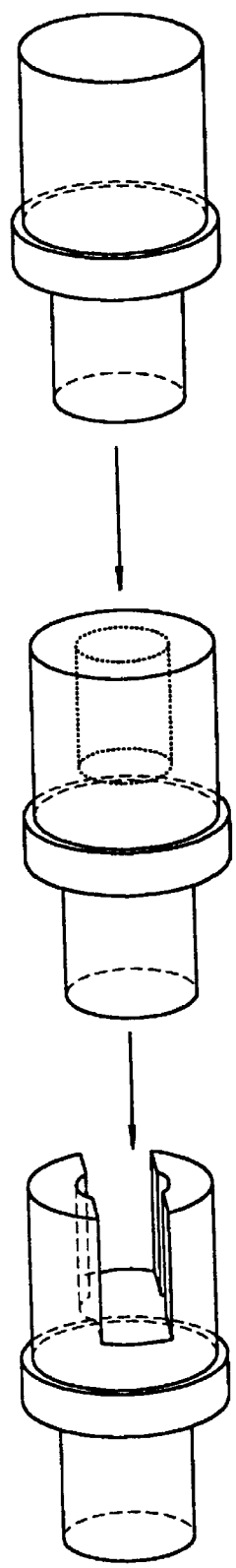
FIG. 3B shows a sequence for forming the magnet holder shown in FIGS. 7A–7D.
Figure 7A:
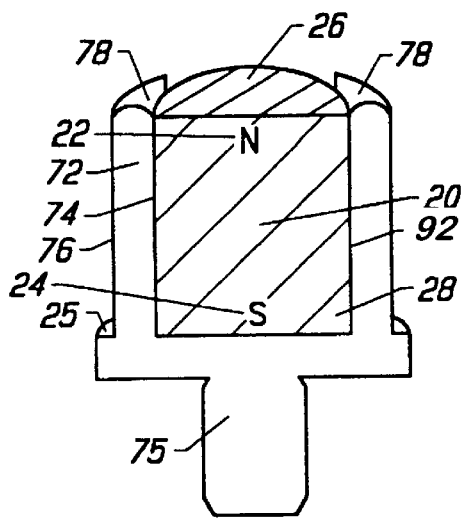
FIGS. 7A–7D show structural variations of a latch assembly where the magnet holder has a plurality of flanges and in which the flanges have concave inner surfaces, wherein FIG. 7A provides a cross-sectional view of the latch assembly with a convex end surface, FIG. 7B provides a top-down view of the latch assembly with a convex end surface, FIG. 7C provides a cross-sectional view of the latch assembly with a conically shaped outer surface, and FIG. 7D provides a top-down view of the latch assembly with a conically shaped outer surface.
Figure 7B:
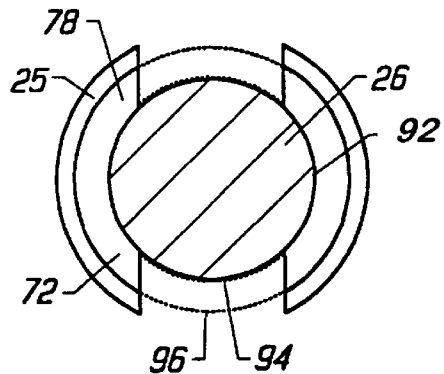
Figure 7C:
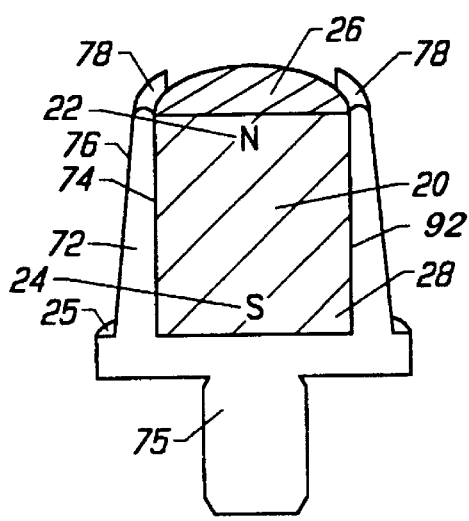
Figure 7D:
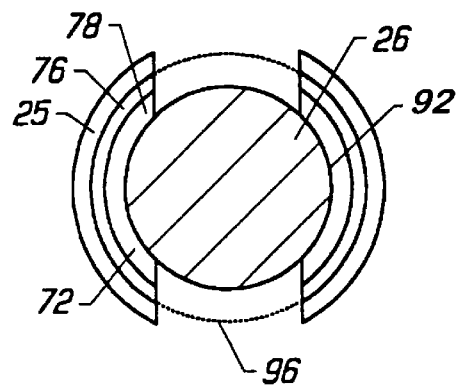
Figure 8A:
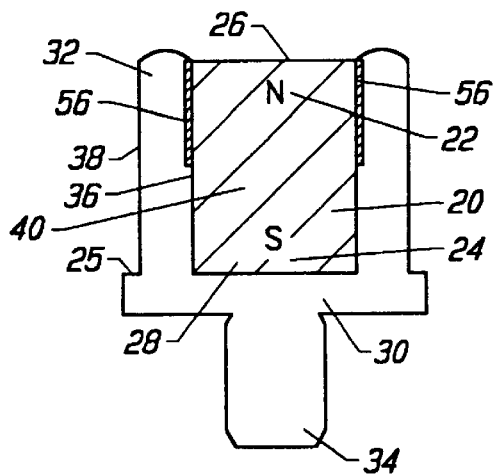
FIGS. 8A–8D show structural variations of a latch assembly in which the magnet holder surrounds the magnet and the latch assembly includes a material with a low magnetic permeability positioned between the magnet and the magnet holder, wherein FIG. 8A provides a cross-sectional view of the latch assembly, FIG. 8B provides a top-down view of the latch assembly, FIG. 8C provides a cross-sectional view of the latch assembly with a conically shaped outer surface, and FIG. 8D provides a top-down view of the latch assembly with a conically shaped outer surface.
Figure 8B:
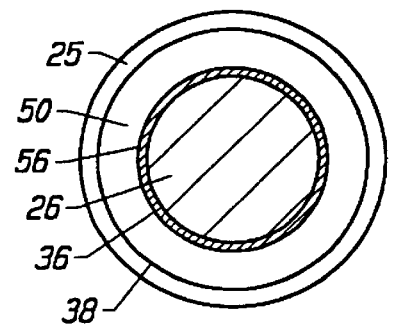
Figure 8C:
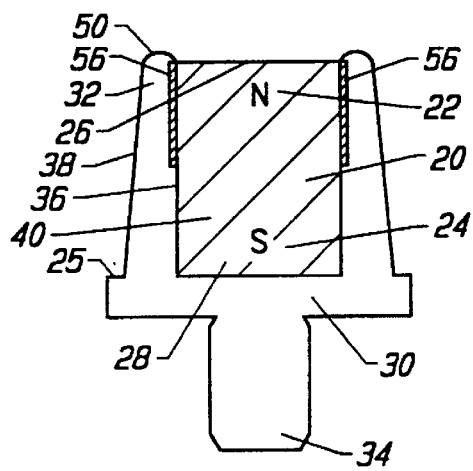
Figure 8D:
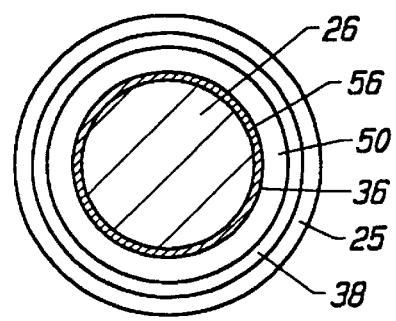
Figure 10A:
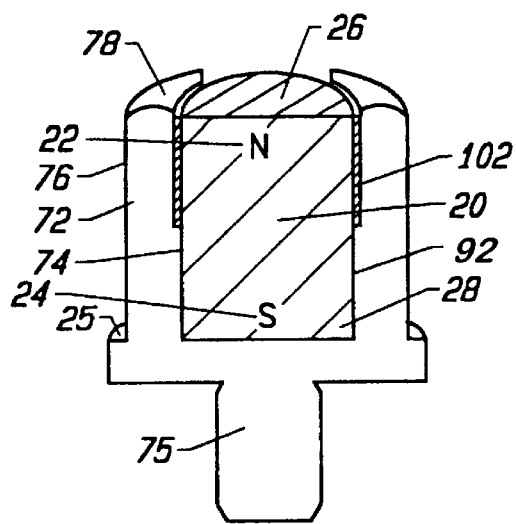
FIGS. 10A–10D show structural variations of a latch assembly where the magnet holder has a plurality of flanges with concave inner surfaces and where the latch assembly includes a material with low magnetic permeability positioned between the magnet and the magnet holder, wherein FIG. 10A provides a cross-sectional view of the latch assembly, FIG. 10B provides a top-down view of the latch assembly, FIG. 10C provides a cross-sectional view of the latch assembly with a conically shaped outer surface, and FIG. 10D provides a top-down view of the latch assembly with a conically shaped outer surface.
Figure 10B:
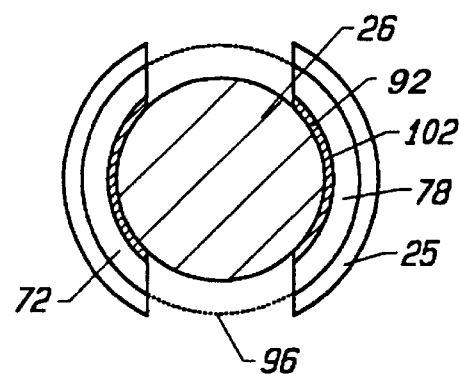
Figure 10C:
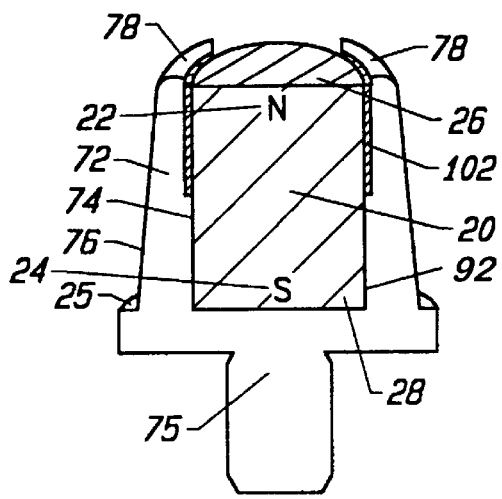
Figure 10D:
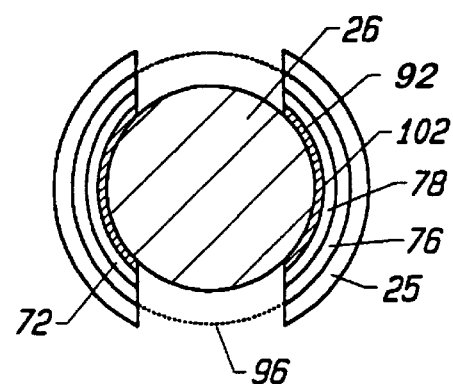

Prior art latch assemblies are generally formed by taking a stamped sheet of metal and bending the metal to create a holder for a magnet. By contrast, the plurality of flanges 72 used to hold the magnet are formed from a unitary body of ferromagnetic material, such as a block of metal. As shown in FIGS. 3A–3B, this facilitates the manufacture of the latch assembly. As shown in FIG. 3A, the latch assembly of FIGS. 2A–2B can be formed from a solid piece of metal by cutting a section from the block. As shown in FIG. 3B, the latch shown in FIGS. 7A–7B can be formed from a block of metal by drilling a cylindrical bore, and followed by removal of portions of the wall surrounding the bore.

Figure 4A:
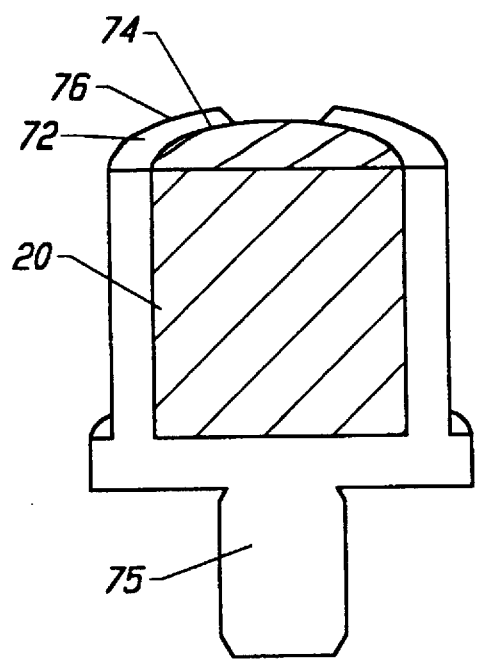
FIGS. 4A–4B show a magnetic latch assembly having a magnet holder with three flanges, wherein FIG. 4A provides a cross-sectional view of the latch assembly, and FIG. 4B provides a top-down view of the latch assembly.
Figure 4B:
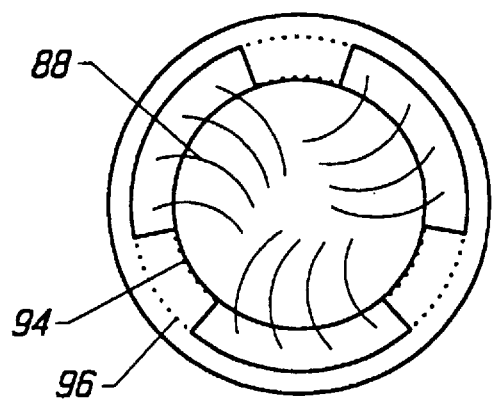

In one embodiment, the magnetic latch assembly has three or more flanges. For example, as shown in FIGS. 4A–4B, the magnetic latch assembly includes three flanges 72 which are substantially evenly distributed around the magnet 20. There is no functional limit to the number of flanges which the latch assembly may have.

In one embodiment of the magnetic latch assembly having a plurality of flanges, as shown in FIG. 2B, the inner surfaces 74 of the plurality of flanges 78 are flat 82.

Alternatively, as shown in FIGS. 4A–4B, the inner surfaces 74 of the plurality of flanges 78 may be concave shaped, thereby defining a substantially cylindrically shaped space 94. Also as shown in FIGS. 4A–4B, the magnet 20 may be substantially cylindrically shaped. The use of a substantially cylindrically shaped space 94 and/or magnet 20 is advantageous for uniformly distributing the magnetic flux around the first magnet end 26 to the plurality of flanges 72. For example, FIG. 4B shows the magnetic flux 88 being distributed substantially uniformly around the first magnet end 26 to the plurality of flanges 72.

According to this invention, the magnetic flux generated by the magnet can be focused onto a smaller area of the magnet holder, for example, onto the end surface of magnet holder or a portion thereof As a result, the local flux density produced by the latch assembly adjacent where the latch contacts the tang 10 is increased, thereby increasing the latching force produced by the latch assembly.

Several structural features may be incorporated into the latch assembly which serve to focus the magnetic flux emitted by the magnet onto a smaller area of the magnet holder. For example, as shown in FIGS. 5A–5D, 6A–6D and 7A–7D, the end surface 32, 78 of the magnet holder 30 can have a convex shape 50 which focuses the magnetic flux 42, 88 on the end surface 32, 78 of the magnet holder 30. By using a convex shape for the end surface 32, 78 of the magnet holder 30, magnetic flux is directed from the edges of the end surface 32, 78 and concentrated at the center of the end surface 32, 78. This serves to enhance the magnetic flux density adjacent where the latch assembly contacts the tang 10 of an actuator assembly.

As shown in FIGS. 4A–4B, 5A–5B, 6A–6B and 7A–7B, the outer surface 38 of the magnet holder 30 and the outer surface 76 of the plurality of flanges 72 can provide the exterior of the magnet holder with a substantially cylindrical shape 96. This facilitates forming a uniform magnet flux distribution.

Figure 5A:
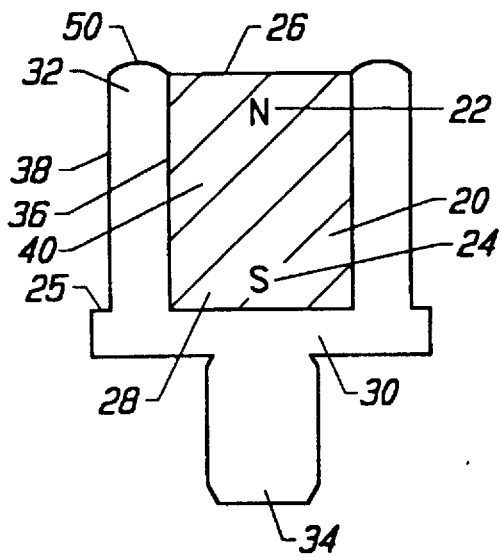
FIGS. 5A–5D show structural variations of a latch assembly in which the magnet holder surrounds the magnet, wherein FIG. 5A provides a cross-sectional view of the latch assembly with a convex end surface, FIG. 5B provides a top-down view of the latch assembly with a convex end surface, FIG. 5C provides a cross-sectional view of the latch assembly with a conically shaped outer surface, and FIG. 5D provides a top-down view of the latch assembly with a conically shaped outer surface.
Figure 5B:
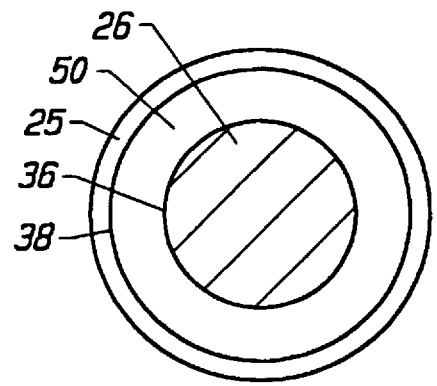
Figure 5C:
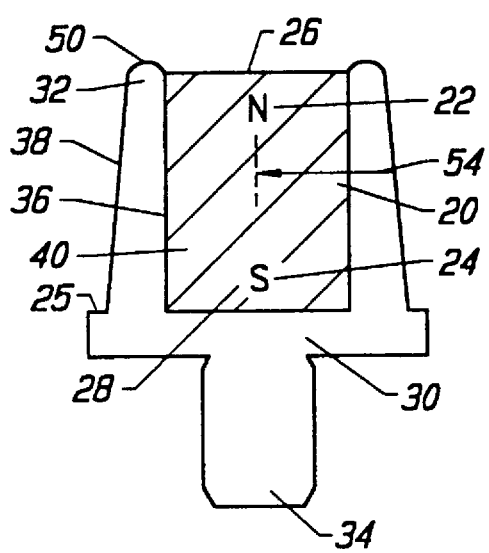
Figure 5D:
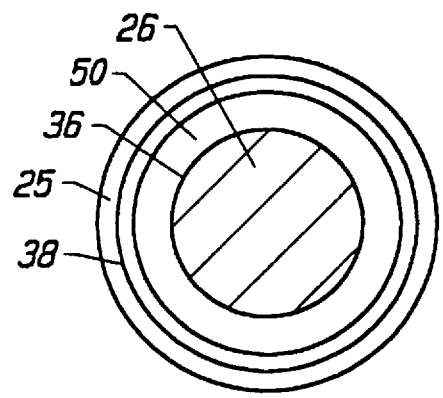

As shown in FIGS. 5C–5D, 6C–6D and 7C–7D, the outer surface 38 of the magnet holder 30 and the outer surface 76 of the plurality of flanges 72 can provide the exterior of the magnet holder with a substantially conical shape whose radius decreases in the direction of the end surface 32, 78. By decreasing the width of the wall defining the space 40 adjacent the end surfaces 32, 78 of the magnet holder, magnetic flux is directed away from the outside surfaces 38, 76 of the magnet holder and the outer edge of the end surfaces of the magnet holder toward the center of end surfaces 32, 78. This tapering of the magnet holder enhances the magnetic flux density adjacent where the latch assembly contacts the tang 10 of an actuator assembly. In FIG. 5C, north and south poles 22 and 24, respectively, of magnet 20 define a longitudinal axis 54. In FIGS. 7A–7D, the magnet holder includes inner surface 92.

As shown in FIGS. 8A–8D, 9A–9D and 10A–10D, the magnetic latch assembly may also include a material 56, 102 having low magnetic permeability positioned between the magnet holder 30 and the magnet 20 adjacent the end surface 32 of the magnet holder 30. The material having low magnetic permeability may be any material which is not highly permeable to a magnetic field. Examples of such materials include air, plastic glue for holding the magnet within the holder and nonmagnetic coatings on the magnet, such as aluminum or nickel. In FIGS. 10A–10D, the magnet holder includes inner surface 92.

The low magnetic permeability material 56, 102 serves to focus the magnetic flux 42, 88 on the end surface 32, 78 of the magnet holder 30 by limiting the amount of magnetic flux which passes from the first magnetic pole 22 of the magnet 20 adjacent the first end 26 of the magnet 20 directly to the magnet holder 30, i.e., without first extending from the first end of the magnet 20 toward the contact area for the tang. According to one embodiment, as shown in FIGS. 8A–8D, the low magnetic permeability material 56, 102 surrounds the magnet 20 adjacent the first end 26 of the magnet 20.

As shown in FIGS. 11A–11C and 12A–12C, the magnetic latch assembly may also include a bumper 58 which covers at least a portion of the end surface 32 to form a contact area between the magnetic latch assembly 12 and the actuator assembly to dampen resonance vibrations within the device caused by collisions between the magnetic latch assembly 12 and the actuator assembly. The bumper may be formed of a variety of dampening materials including plastic and rubber. In one embodiment, the bumper is formed of ULTEM plastic.

Figure 11A:
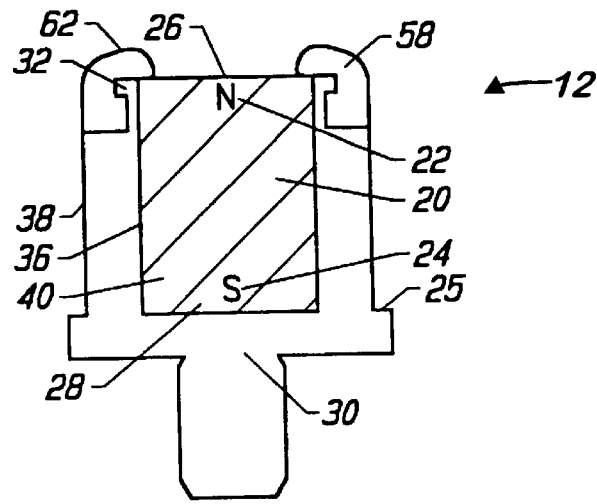
Figure 11B:
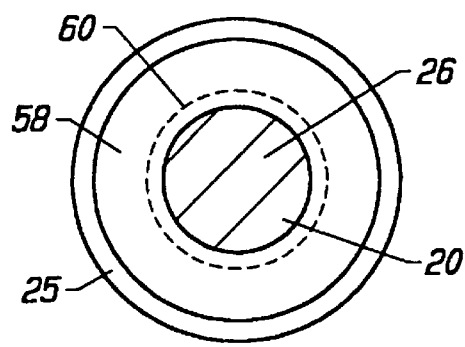

For example, as shown in FIGS. 11A–11B, the bumper 58 may have an annular shape 60, centered around the first end 26 of the magnet 20 to create an annular contact area between the magnetic latch assembly 12 and the actuator assembly. In one embodiment, shown in FIGS. 11A–1B, the annular shaped bumper 58 has a radial cross-section with a surface having a convex shape 62. This serves to reduce the contact area formed by the bumper.

Figure 12A:
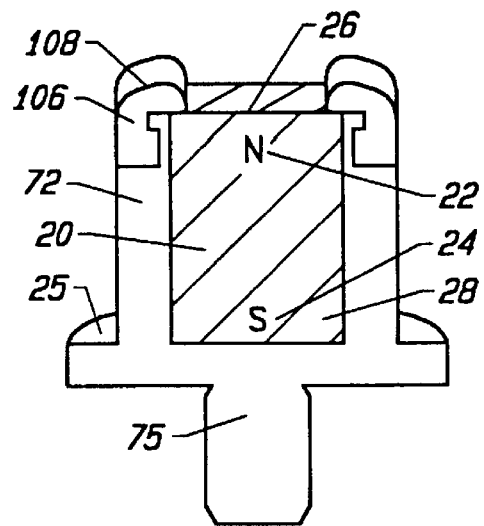
Figure 12B:
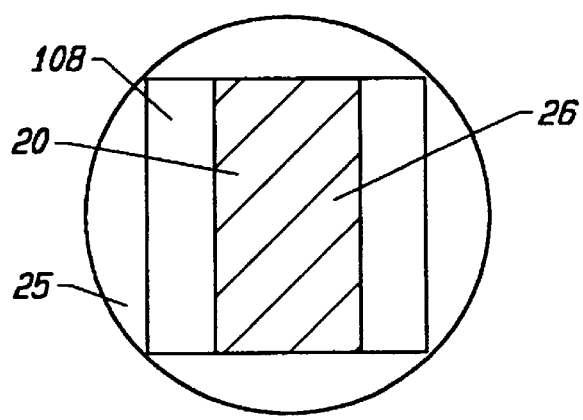

Alternatively, as shown in FIGS. 12A–12B, the bumper 106 may form a series of contact points for the latch assembly which cover all or portions of the end surfaces of the magnet holder. Bumper 106 includes surfaces 108.

Figure 11C:
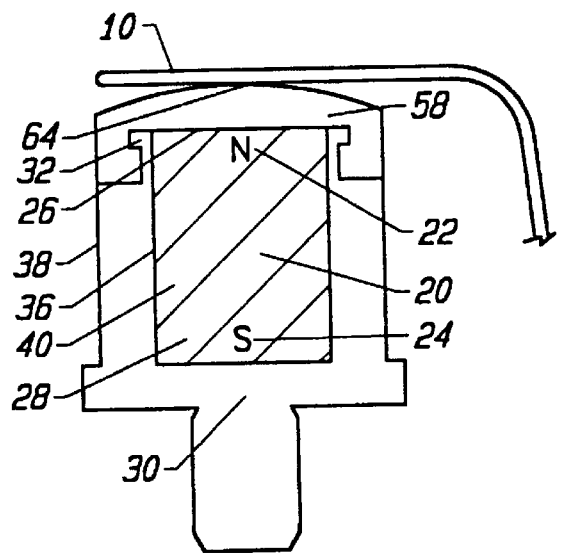
Figure 12C:
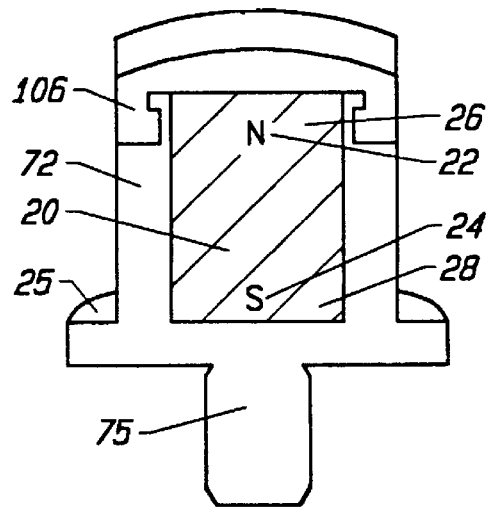

As shown in FIGS. 11C and 12C, the bumper 58 may also be used to cover the first end 26 of the magnet 20. In one embodiment, also shown in FIGS. 11C and 12C, the outer surface 64 of the bumper has a convex shape which forms a single contact point between the magnetic latch assembly and the actuator assembly.

The magnet used in the magnetic latch assembly may be formed of any magnetic material. In one embodiment, the magnet is a solid magnet. Solid magnets are preferred for use in the latch assembly of this invention because of their greater structural integrity as compared to composite magnets which can fragment as a result of repeated collisions with the actuator assembly tang. Fragmentation can damage the disk medium and interfere with the accurate positioning of the actuator assembly.

In one embodiment, the magnet is a solid sintered magnet formed of a rare earth metal alloy. Solid sintered magnets are generally preferred for use in the latch assembly of this invention because of the enhanced magnetic field strength of these magnets. In one embodiment, the magnetic field intensity of the magnet is at least $1.6 \times 10^5$ Tesla Ampere/meter (20 MGOe). Examples of solid sintered magnets which may be used with the latch assembly of this invention include, but are not limited to magnets formed of neodymium-iron-boron and samarium-cobalt alloys.

The ferromagnetic material used to form the magnet holder may be made of any magnetic material which is noncorrosive or coated with a coating to prevent corrosion. The material should also be hard enough to withstand the forces associated with the latch colliding with a tang. In one embodiment, the ferromagnetic material is a magnetic stainless steel such as 12L14 magnetic steel.

Figure 13:
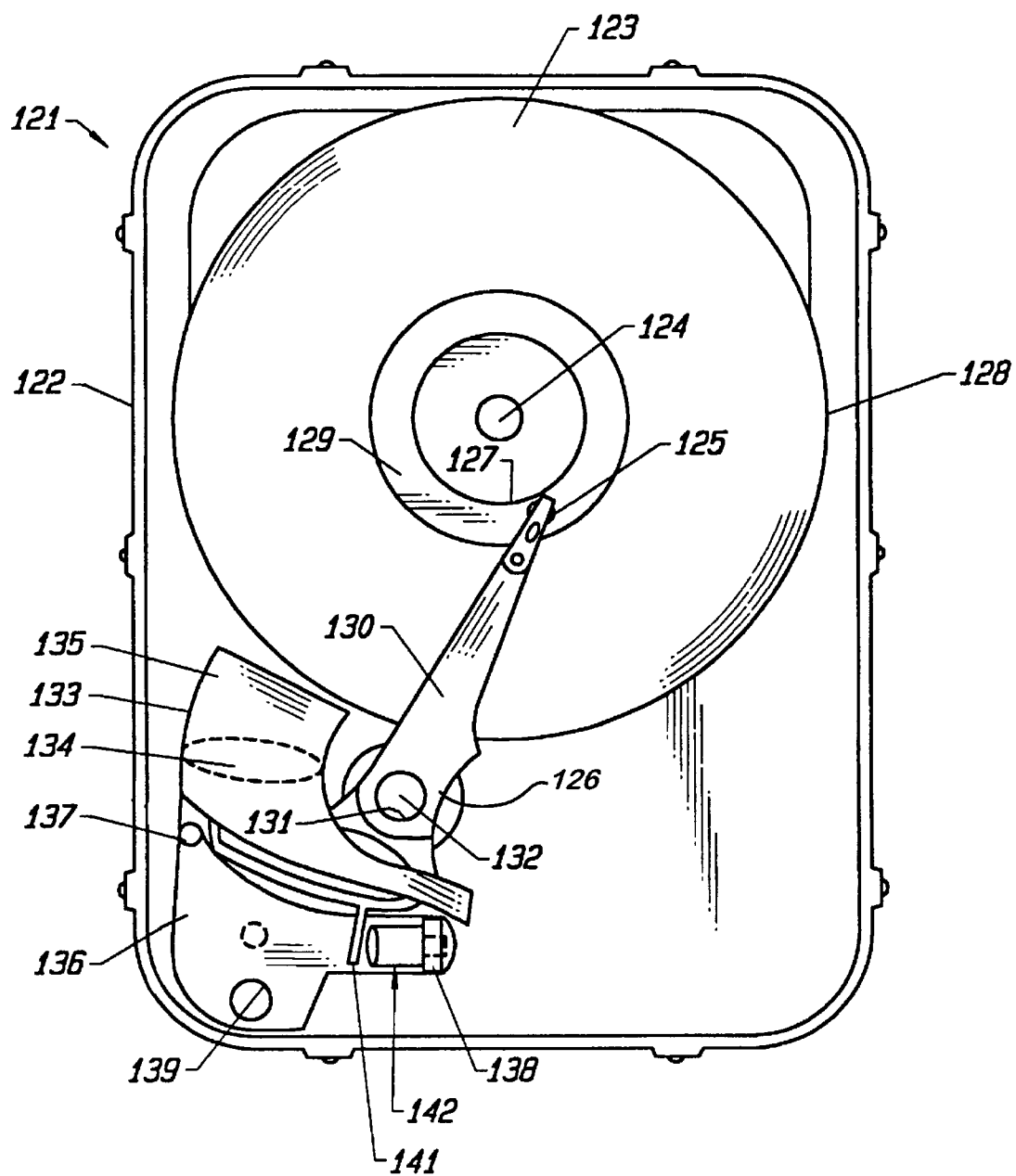
FIG. 13 shows the incorporation of a magnetic latch assembly of this invention into a disk drive.

FIG. 13 shows the incorporation of a magnetic latch assembly of this invention into a disk drive. While the following description refers to a disk drive having a single read/write head and a single disk, it should be understood that the latch assembly of this invention may be used with a wide variety of read/write head and disk drive configurations and is suitable for use with any combination of multiple read/write heads and multiple disks.

As shown in FIG. 13, the disk drive 121 includes a base 122 which functions as a support for most of the internal components of disk drive. The disk drive 121 includes a spin motor (not shown) connected to a disk 123 via a shaft 124 for rotating the disk 123. The disk drive 121 further includes a read/write head 125 and an actuator assembly 126.

The disk 123 includes an inside diameter 127, an outside diameter 128, and an annularly shaped landing zone 129 over which the read/write head 125 is immobilized when the disk drive is not in use. The landing zone 129 may be at any selected portion of disk drive and is generally a portion of the disk where no information is stored. Most commonly, the landing zone 129 is positioned between the inside and outside diameters 127 and 128.

The actuator assembly 126 includes an actuator arm 130 which has an opening 131 through which an armature shaft 132 controlled by armature 133 extends. Current which is passed through coil assembly 134 covered by a casing 135 creates torque that drives the armature shaft 132 so that actuator arm 130 may be pivoted to position the read/write head 125 over selected locations of the disk 123 between the inside and outside diameters 127 and 128 during operation and over the landing zone 129 when the drive is not in operation.

The disk drive also includes a crash stop 136 which is designed to prevent movement of the actuator assembly 126 beyond predetermined points. The crash stop 136 is generally made from a resilient impact-absorbing material, such as plastic, in order to reduce vibrations within the disk drive caused by the actuator assembly 126 contacting the crash stop 136. The crash stop 136 includes a series of integrally-formed, upstanding projections 137 and 138 and an opening 139 through which a screw (not shown) extends to secure the crash stop 136 to the base 122 of disk drive 121.

Movement of the actuator assembly 126 is limited by a tang 141 fixedly attached to the actuator assembly 126. Projection 137 defines an outer crash stop and projection 138 defines an inner crash stop.

In one direction, movement of the actuator assembly 126 is limited by the coupling of the tang 141 to a magnetic latch assembly 142 which is fixedly mounted to projection 138 on the crash stop 136. By magnetically coupling the ferromagnetic tang 141 to the magnetic latch assembly 142, the read/write head 125 is immobilized when the drive is not in operation.

The foregoing description of the invention has been presented for purposes of illustration and description. It is not intended to be exhaustive or to limit the invention to the precise forms disclosed. Clearly, many modifications and variations will be apparent to practitioners skilled in this art. It is intended that the scope of the invention be defined by the following claims and their equivalents.

We claim:

1. A magnetic latch assembly having an enhanced magnetic flux distribution for magnetically coupling the magnetic latch assembly to an actuator assembly of a disk drive, the actuator assembly including a tang, the magnetic latch assembly comprising:

a permanent magnet including:
first and second ends;
a first magnetic pole at the first end;
a second magnetic pole at the second end;
the first and second magnetic poles defining a longitudinal axis;
a unitary magnet holder comprising a ferromagnetic material, the magnet holder including:
a space for holding the magnet;
an inner surface surrounding the magnet;
an outer surface defining an exterior portion of the magnet holder;
an end surface means connecting the inner and outer surfaces of the magnet holder, the end surface means defining multiple contact areas that lie in a common plane perpendicular to the longitudinal axis, the contact areas for contacting the tang when the disk drive is not in operation;
the first end of the magnet facing away from the magnet holder with the end surface means being longitudinally spaced-apart from the first end; and
wherein the magnet is positioned within the space such that a majority of magnetic flux, produced by the magnet, at the first end extends between the first end of the magnet and the end surface means of the magnet holder to magnetically couple the actuator assembly.

2. The magnetic latch assembly of claim 1 wherein the end surface means of the magnet holder has a convex shape which focuses the magnetic flux on the end surface means of the magnet holder.

3. The magnetic latch assembly of claim 1 wherein the end surface means of the magnet holder surrounds the first end of the magnet, the magnetic flux being distributed substantially uniformly around the first end of the magnet to the magnet holder.

4. The magnetic latch assembly of claim 1 wherein the space in the magnet holder is substantially cylindrically shaped.

5. The magnetic latch assembly of claim 1 wherein the magnet is substantially cylindrically shaped.

6. The magnetic latch assembly of claim 1 wherein the outer surface defining the exterior portion of the magnet holder is substantially cylindrically shaped.

7. The magnetic latch assembly of claim 1 wherein the outer surface defining the exterior portion of the magnet holder is substantially conically shaped, the radius of the conically shaped outer surface decreasing in the direction of the end surface means.

8. The magnetic latch assembly of claim 1 further including a material having low magnetic permeability positioned between the magnet holder and the magnet adjacent the end surface means of the magnet holder to focus the magnetic flux on the end surface means of the magnet holder.

9. The magnetic latch assembly of claim 8 wherein the low magnetic permeability material surrounds the magnet adjacent the first end of the magnet.

10. The magnetic latch assembly of claim 1 wherein the end surface means includes an annular end surface surrounding the magnet.

11. The magnetic latch assembly of claim 10 wherein the annular end surface has a convex shape.

12. The magnetic latch assembly of claim 10 further comprising:
a material having low magnetic permeability, the material being cylindrically shaped and surrounding the magnet in the direction of the longitudinal axis.

13. The magnetic latch assembly of claim 1 wherein the end surface means includes a plurality of end surfaces.

14. The magnetic latch assembly of claim 13 wherein the magnet holder includes a plurality of flanges.

15. The magnetic latch assembly of claim 1 wherein the magnet is a sintered magnet formed of a rare earth metal alloy.

16. The magnetic latch assembly of claim 15 wherein the sintered magnet is selected from the group consisting of neodymium-iron-boron and samarium-cobalt.

17. A magnetic latch assembly having an enhanced magnetic flux distribution for magnetically coupling the magnetic latch assembly to an actuator assembly of a disk drive, the actuator assembly including a tang, the magnetic latch assembly comprising:
a permanent magnet including:
first and second ends;
a first magnetic pole at the first end;
a second magnetic pole at the second end;
the first and second magnetic poles defining a longitudinal axis;
a magnet holder comprising a ferromagnetic material, the magnet holder including:
a space for holding the magnet;
an inner surface surrounding the magnet;
an outer surface defining an exterior portion of the magnet holder;
an annular end surface connecting the inner and outer surfaces of the magnet holder, the end surface defining multiple contact areas that lie in a common plane perpendicular to the longitudinal axis, the contact areas for contacting the tang when the disk drive is not in operation;
the first end of the magnet facing away from the magnet holder with the end surface being longitudinally spaced-apart from the first end; and
wherein the magnet is positioned within the space such that a majority of magnetic flux, produced by the magnet, at the first end extends between the first end of the magnet and the end surface of the magnet holder to magnetically couple the actuator assembly.

18. The magnetic latch assembly of claim 17 wherein the end surface has a convex shape.

19. The magnetic latch assembly of claim 18 wherein the outer surface is conically shaped, the radius of the conically shaped outer surface decreasing in the direction of the end surface.

20. The magnetic latch assembly of claim 19 further comprising:
a material having low magnetic permeability, the material being cylindrically shaped and surrounding the magnet in the direction of the longitudinal axis.

21. The magnetic latch assembly of claim 20 wherein the material is positioned between the magnet and the magnet holder.

22. The magnetic latch assembly of claim 17 wherein the magnet is cylindrically shaped.

23. The magnetic latch assembly of claim 22 wherein a portion of the magnet abuts the inner surface.

* * * * *